United States Patent
Cavallotti et al.

(10) Patent No.: US 9,693,653 B2
(45) Date of Patent: Jul. 4, 2017

(54) PROCESS FOR MANUFACTURING A COOKWARE ARTICLE WITH ELECTROFORMED SILVER OR SILVER ALLOY INTERIOR

(71) Applicant: San Lorenzo s.r.l., Milan (IT)

(72) Inventors: Pietro Luigi Cavallotti, Milan (IT); Ciro Cacchione, Arluno (IT)

(73) Assignee: SAN LORENZO S.R.L., Milan (IT)

( * ) Notice: Subject to any disclaimer, the term of this patent is extended or adjusted under 35 U.S.C. 154(b) by 345 days.

(21) Appl. No.: 14/420,495

(22) PCT Filed: Aug. 1, 2013

(86) PCT No.: PCT/EP2013/066159
§ 371 (c)(1),
(2) Date: Feb. 9, 2015

(87) PCT Pub. No.: WO2014/023638
PCT Pub. Date: Feb. 13, 2014

(65) Prior Publication Data
US 2015/0182068 A1    Jul. 2, 2015

(30) Foreign Application Priority Data
Aug. 8, 2012 (IT) .............................. MI2012A1412

(51) Int. Cl.
*C23C 8/16* (2006.01)
*A47J 36/02* (2006.01)
(Continued)

(52) U.S. Cl.
CPC ................. *A47J 36/02* (2013.01); *C23C 8/16* (2013.01); *C23C 8/20* (2013.01); *C23C 8/24* (2013.01);
(Continued)

(58) Field of Classification Search
CPC .... C23C 8/16; C23C 8/20; C23C 8/24; C23C 8/30; C23C 8/321; C23C 8/241;
(Continued)

(56) References Cited

U.S. PATENT DOCUMENTS 2,465,608 A * 3/1949 Scavullo .................. C25D 7/00
  205/122
3,090,118 A * 5/1963 Hanzel .................... A47J 36/02
  164/75
(Continued)

FOREIGN PATENT DOCUMENTS

GB         920943 A       3/1963
WO    2006/024799 A1      3/2006

*Primary Examiner* — Colleen Dunn
(74) *Attorney, Agent, or Firm* — Jacobson Holman, PLLC

(57) ABSTRACT

A process for manufacturing a cookware article is described comprising the steps of forming, surface hardening, oxidizing and electroforming of very hard silver or silver alloys to coat the interior part of the article. Silver ensures antibacterial and antiviral properties, improved thermal conductivity allowing to cook under the cracking threshold of oils and greases either added to or present in the substances being cooked, inhibits the sticking of food while cooking and facilitates the detachment from the surface of the articles.

15 Claims, 1 Drawing Sheet

(51) Int. Cl.

| | | |
|---|---|---|
| *C23C 8/20* | (2006.01) | |
| *C23C 8/24* | (2006.01) | |
| *C23C 8/30* | (2006.01) | |
| *C23C 28/00* | (2006.01) | |
| *C25D 3/46* | (2006.01) | |
| *C25D 3/64* | (2006.01) | |
| *C25D 5/34* | (2006.01) | |
| *C25D 5/48* | (2006.01) | |
| *C25D 5/50* | (2006.01) | |
| *C25D 7/00* | (2006.01) | |

(52) U.S. Cl.
CPC .............. *C23C 8/30* (2013.01); *C23C 28/321* (2013.01); *C23C 28/34* (2013.01); *C23C 28/341* (2013.01); *C23C 28/345* (2013.01); *C25D 3/46* (2013.01); *C25D 3/64* (2013.01); *C25D 5/34* (2013.01); *C25D 5/48* (2013.01); *C25D 5/50* (2013.01); *C25D 7/00* (2013.01)

(58) Field of Classification Search
CPC .. C23C 8/245; C25D 3/46; C25D 3/64; C25D 5/34; C25D 5/48; C25D 5/50; C25D 7/00
See application file for complete search history.

(56) References Cited

U.S. PATENT DOCUMENTS

| | | |
|---|---|---|
| 7,960,034 B2 | 6/2011 | Groll |
| 2008/0061068 A1* | 3/2008 | Fontaine ................ A01N 59/16 220/573.2 |

\* cited by examiner

PROCESS FOR MANUFACTURING A COOKWARE ARTICLE WITH ELECTROFORMED SILVER OR SILVER ALLOY INTERIOR

The present invention relates to a process for manufacturing a cookware article, with silver or silver alloys interior obtained by electroforming.

BACKGROUND OF THE INVENTION

Metallic composite, multilayer pans, in which metal layers with high thermal conductivity alternate with stainless steel layers, are known in the prior art.

According to patent GB920943, a composite metallic object comprises a layer of stainless steel, a strike of a nickel on at least one face and a plating of tin, cadmium or silver. An outer layer of die-cast aluminum is used as means for transferring heat to the stainless steel layer, used as cooking surface of a cookware article. Patent GB920943 also discloses a method of making a laminated device which includes a metallic member of desired shape, a strike of nickel, and provided with a metal plating, of the tin, cadmium or silver type, on which the aluminum is cast.

U.S. Pat. No. 7,960,034 provides various multilayer composite combinations of different metals to make copper-coated cookware. In various embodiments, a layer of silver is used to connect interior, adjacent layers of aluminum in order to further improve thermal conductivity. The silver layer is a thin foil, approximately 0.003-0.005 inches thick, applied by plating or other known means.

BRIEF SUMMARY OF THE INVENTION

In view of the prior art, it is the object of the present invention to provide a method for making a cookware article formed by a metallic vessel coated inside with a layer of silver or silver alloys which is different from those known and which improves the food cooking properties.

In accordance with the present invention, said object is achieved by means of a process for manufacturing a cookware article, comprising the steps of forming, surface hardening and oxidation, characterized in that it also includes electroforming of silver or silver alloys to coat the internal part of the vessel.

Advantageously, the internal surface of the cookware article includes a layer of material with excellent antibacterial and antiviral properties, capable of not altering the oils and greases either added to or present in the substances being cooked, inhibiting the sticking and facilitating the detachment of food from the bottom of the cookware during the step of cooking.

BRIEF DESCRIPTION OF THE SEVERAL VIEWS OF THE DRAWING(S)

The features of the present invention will be more apparent in the following description of some practical embodiments shown by way of non-limitative example in the accompanying drawings, in which.

DETAILED DESCRIPTION OF THE INVENTION

Figure 1:
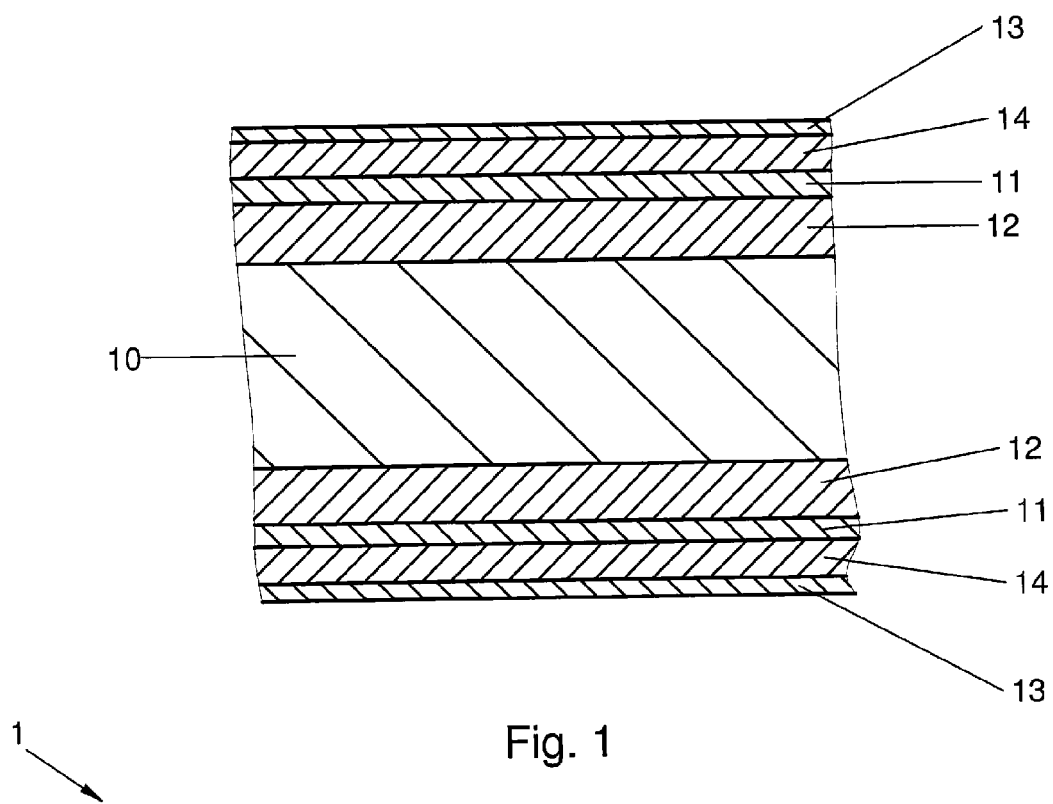
FIG. 1 is a section view of a portion of a ferrous material vessel subjected to a thermochemical treatment.
Figure 2:
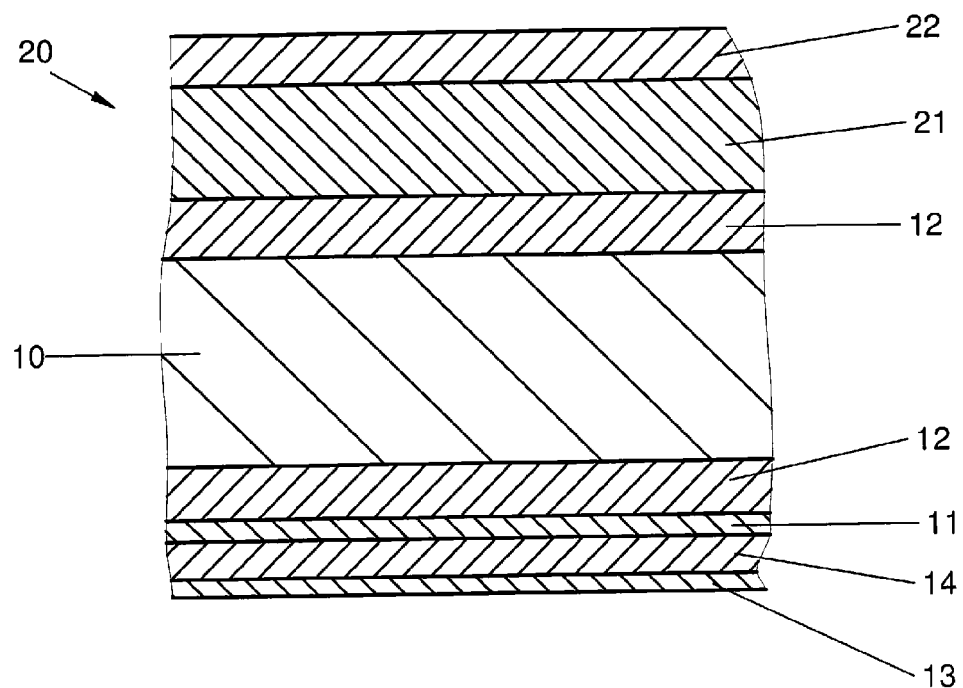
FIG. 2 is a section view of the portion in FIG. 1 to which a metallic layer was applied after the step of polishing.

A cookware article 1 is formed by a ferrous material vessel 10 to the inside of which a metallic layer 20 is applied.

The ferrous material vessel 10, shaped and trimmed according to the prior art, is firstly subjected to a surface hardening process, followed by an oxidation process to prevent corrosion and by a finishing treatment.

The surface hardening processes include nitriding, in which the ferrous material vessel is placed in a gaseous environment, or gaseous environment with plasma (ion nitriding). Alternatively, electrolytic salt bath nitriding may be used.

A variant to the nitriding process may be nitrocarburizing or gaseous or salt bath carburization.

Gas nitriding is performed by thermal dissociation of ammonia on the catalytic ferrous surface, and the produced nitrogen atoms are diffused in the iron substrate forming the vessel 10. Nitriding also implies the formation of a surface layer of iron nitrides 11 in addition to the diffusion layer 12 of nitrogen in the iron of the vessel 10, which penetrates for a thickness in the order of fifty microns or so. The harness and depth of the nitrogen diffusion layer 12 depends on the nitriding power (PN), which in turn depends on the degree of dissociation of ammonia.

After the surface hardening process, the vessel 10 is subjected to a gaseous oxidation process with water or nitrogen protoxide or to aqueous chemical oxidation process using ionic liquids. The oxidation process is carried out in the same furnace used for the surface hardening process and causes the formation of a thin layer of magnetite iron oxides 13, thinner than 1 micron, and a layer of nitroxides 14, under layer 13.

The inside of the vessel 10 is thus mirror-polished with cloths to remove the oxidized layer 14 and part of the nitrided layer 12.

The second step of the process for manufacturing a cookware article 1 includes coating the inside of the vessel 10 with a layer 20 of electroformed silver or silver alloy.

Electroforming of silver or silver alloys consists in coating the iron substrate 10 with a layer of silver or silver alloys 21 which may be several tens of microns thick, or even a hundred microns thick, with hardness higher than that of metallurgic silver.

Alternatively to electroforming with pure silver, a layer 22 of silver-tin or germanium-silver or antimony-silver or bismuth-silver alloy may be used, which either replaces or contributes to hardening the layer 21 of electroformed silver, making it less sulphurable or limiting blackening which may be caused by some foods during cooking.

A variation of this process requires electroforming the silver layer before the surface hardening and oxidation process.

The vessel 10 may be made of Armco iron or nitriding steel or case-hardening steel or even of east iron. A nickel-free martensitic stainless steel may be used in order to increase the heat strength of the article.

Armco iron has a very high magnetic permeability and a negligible magnetic coercivity; being a mild magnetic material it is particularly suited to make cookware articles for cooking on magnetic induction ranges. The oxidation of nitrided Armco iron considerably increases corrosion resistance because it is made of passivating magnetite.

Some examples of manufacturing of cookware according to the present invention are described below.

Example 1

An Armco iron pot is polished to eliminate mechanical unevenness caused by production. The pot is then nitrided in furnace at 550° C. for 4 hours in dissociated ammonia atmosphere, $NH_3/H_2$, with nitriding power PN=0.95. After having been washed in nitrogen, it is oxidized for 2 hours by submersion in aqueous vapor in the same furnace at a temperature of 490° C. or 520° C. The inside of the pot is mirror-polished with cloths to remove the oxidized layer and part of the nitrided layer. Finally, the interior is silver-plated by introducing the pot into a commercial alkaline cyanide silver-plating solution with central silver anode, and continuous feeding of the solution by means of a recirculation pump. The silver electroforming continues until a thickness of 0.1 mm is reached. The silver plating maintains its initial shine without needing to be polished further.

Example 2

An Armco iron pan is polished to eliminate mechanical unevenness caused by production. The pan is then nitrided in furnace at 500° C. for 2 hours in dissociated ammonia atmosphere, $NH_3/H_2$, with nitriding power PN=0.90. After having been washed in nitrogen, it is oxidized for 1 hour by submersion in aqueous vapor in the same furnace at a temperature of 470° C. or 500° C.

The inside of the pan is mirror-polished with cloths to remove the oxidized layer and part of the nitrided layer.

The internal part of the pan is finally silver-plated by placing the pan on a specific frame and introducing the frame, appropriately screened, into a tank containing the commercial cyanide alkaline silver-plating solution, with silver anode counterpoised to the pot, and continuous feeding of the solution into the tank by means of a recirculation pump. The electroforming of silver continues until a thickness of 0.2 mm is reached.

The silver plating maintains its initial shine without needing to be polished further.

Example 3

An Armco iron coffee pot is polished to eliminate mechanical unevenness caused by production. The coffee pot is pre-nitrided in furnace in disassociated ammonia atmosphere, $NH_3/H_2$ at 520° C. for 1.5 hours with high nitriding power PN=1.6. It is then nitrided for 3 hours at 600° C. with nitriding power lower than PN=0.80. The process then continues with oxidation, polishing with cloths and electroplating of silver as in example 1.

Example 4

An Armco iron teapot is polished to eliminate mechanical unevenness caused by production. The teapot is then nitrocarburized in furnace at 530° C. for 5 hours fed with ammonia and carbon dioxide, in atmosphere containing ammonia, (reaction) hydrogen and carbon oxide. The process then continues with oxidation, polishing with cloths and electroplating of silver as in example 1.

Example 5

An Armco iron pot is polished to eliminate mechanical unevenness caused by production. The pot is then nitrided in furnace at 550° C. for 4 hours in dissociated ammonia atmosphere, $NH_3/H_2$, with nitriding power PN=0.95. After washing with nitrogen, it is oxidized for 3 hours by submersion in nitrogen protoxide from 4% to 12% in the same furnace at a temperature from 450° C. to 550° C. The process then continues with polishing with cloths and electroplating of silver as in example 1.

Example 6

An Armco iron pot is polished to eliminate mechanical unevenness caused by production. After appropriate pickling, the internal part of the Armco iron pot is coated with silver by introducing the pot in a commercial cyanide alkaline silver-plating solution with central silver anode and continuous feeding of the solution by means of a recirculation pump. The electroforming of silver continues until a thickness of 0.1 mm is reached. The pot is then nitrided in furnace at 550° C. for 4 hours in dissociated ammonia atmosphere. $NH_3/H_2$, with nitriding power PN=0.95. After having been washed in nitrogen, it is oxidized for 2 hours by submersion in aqueous vapor in the same furnace at a temperature from 490° C. to 520° C. The inside of the pot is then polished with cloths.

The cookware article 1, formed by the metallic vessel 10, subjected to the thermochemical treatments, and the inner layer 20, comprising a layer of silver deposited by electroforming, reaches the objective of improving the cooking property of food by facilitating uniform heat distribution; it has antibacterial and antiviral properties and facilitates the detachment of cooked food from the inner surface of the cookware article.

The thermochemical treatments confer a pleasant appearance to the object due to the contrast of the black nitriding, nitrocarburizing or carboxylation finish and the reflecting white of the silver.

The nitriding, nitrocarburizing or carboxylation treatments make the iron surface hard and corrosion-resistant with a behavior even superior to that of austenitic stainless steel, above all in terms of resistance to pitting, in addition to having a better tempering stability, and thus hot hardness, resistance to fatigue and notching, as well as dimensional stability.

Electroformed silver and silver alloys are harder and stronger than sheet silver, and thus less subject to possible scratching and abrasions.

The use of a silver-based coating on kitchen utensils is advantageous for the antibacterial and antiviral properties of silver, its high thermal conductivity which allows to cook under the cracking threshold of oils and greases either added or present in the substances being cooked and its capacity of inhibiting the sticking of food during the step of cooking, thus facilitating the detachment of food from the bottom of the cookware article.

Cast iron and aluminum may also be coated inside with electroformed silver or silver alloys after appropriate surface finished treatments.

The invention claimed is:

1. A process for manufacturing a cookware article, comprising forming, surface hardening and oxidation, wherein it also includes electroforming of silver or silver alloys to coat the internal part of the article.

2. The process according to claim 1, wherein the electroforming follows the steps of surface hardening and oxidation.

3. The process according to claim 1, wherein the electroforming precedes the step of surface hardening and oxidation.

4. The process according to claim 1, wherein it includes a final polishing.

5. The process according to claim 1, wherein it includes the electroforming of silver and as an alternative or after it the deposition of an alloy of silver-tin or silver-germanium, or silver-antimony or silver-bismuth.

6. The process according to claim 1, wherein the material of the article is ferrous.

7. The process according to claim 1, wherein the surface hardening process consists of a nitriding treatment.

8. The process according to claim 1, wherein the surface hardening process consists of a nitrocarburizing treatment.

9. The process according to claim 1, wherein the surface hardening process consists of a carburization treatment.

10. The process according to claim 1, wherein it includes a finishing treatment before the surface hardening treatment.

11. The process according to claim 7, wherein the nitriding treatment takes place in a furnace at a temperature between 500° C. and 600° C., preferably at 550° C., for a period of between 1 and 5 hours, preferably 4 hours, in the atmosphere of dissociated ammonia NH3/H2 with nitriding potential PN between 0.80 and 1.6.

12. The process according to claim 7, wherein it includes a first nitriding treatment inside furnace with dissociated ammonia atmosphere NH3/H2 at 520° C. for 1.5 hours with nigh nitriding power, preferably PN=1.6, and a second nitriding treatment inside furnace with dissociated ammonia atmosphere NH3/H2 for 3 hours at 600° C. with a lower nitriding potential, preferably PN=0.80.

13. The process according to claim 1, wherein the oxidation takes place for a period between 1 hour and 4 hours by injection of aqueous vapour into the furnace at a temperature between 400° C. and 600° C., preferably of 450° C. or 520° C.

14. The process according to claim 1, wherein the oxidation takes place for a period between 0.5 hours and 4 hours, preferably 3 hours, by injection of nitrous oxide between 2% and 12% in the same furnace at temperatures between 450° C. and 550° C., preferably of 490° C. or 520° C.

15. The process according to claim 1, wherein the inner coating obtained as a result of electroforming is between 0.1 and 0.2 mm.

* * * * *